his inventio# United States Patent Office 3,075,016
Patented Jan. 22, 1963

3,075,016
CATALYTIC DECARBOXYLATION OF FATTY ACIDS TO PRODUCE KETONES
Edgar S. Hammerberg and Russell Chesrown, Chicago, Ill., assignors, by mesne assignments, to Armour & Company, Chicago, Ill., a corporation of Delaware
No Drawing. Filed May 7, 1958, Ser. No. 733,496
5 Claims. (Cl. 260—595)

This invention relates to a method of decarboxylating fatty acids over magnesium catalysts. The invention is particularly related to a method of maintaining the activity of magnesium oxide catalysts at high levels over extended periods of time. The invention is also particularly related to the catalytic decarboxylation of fatty acids to form aliphatic ketones.

It has been known heretofore that fatty acids could be decarboxylated by heat in the presence of magnesium decarboxylation catalysts. The production of aliphatic aldehydes and ketones may be accomplished by decarboxylating fatty acids. One problem which has been encountered in this type of procedure is that the magnesium catalysts have an undesirably short life when employed for decarboxylating higher fatty acids. During the course of the reaction the magnesium catalysts are apparently attacked in some way so that there is an eroding of the catalysts' surfaces, thus lowering the efficiency of the catalysts and causing plugging of the reaction column. For these reasons excessive amounts of magnesium catalysts have been required in large scale operations involving catalytic decarboxylation of higher fatty acids. The short active life of the magnesium catalysts is a serious disadvantage in commercial operations since such catalysts are rather expensive, being ordinarily prepared from highly purified magnesium compounds and necessarily being formed in the pellets for use as a catalyst or alternatively being dispersed upon an inert catalyst carrier prior to utilization in the decarboxylation procedure.

It is therefore a general object of this invention to provide a method for conserving magnesium catalysts in the decarboxylation of higher fatty acids. It is a further object to provide a method for the decarboxylation of fatty acids wherein the activity of the magnesium oxide catalyst bed is maintained at high levels over long periods of time. It is a further object to provide a method of decarboxylating fatty acids to produce aliphatic ketones. It is a further specific object of the invention to provide a method for the continuous deposition or rejuvenation of magnesium oxide catalysts upon an inert carrier bed during catalytic decarboxylation processes.

The method of this invention will probably find its greatest utility in the production of aliphatic aldehydes and ketones by the reaction of fatty acids containing from 8 to 22 carbon atoms with fatty acids containing from 1 to 22 carbon atoms. For example methyl aliphatic ketones can be produced by reacting acetic acid with fatty acids containing from 8 to 22 carbon atoms. The higher fatty acids can be reacted with themselves to produce compounds such as stearone, which is the symmetrical ketone formed from stearic acid. As a further example aliphatic aldehydes can be obtained by reacting formic acid with a higher fatty acid.

The invention broadly stated involves the preparation of a magnesium oxide catalyst supported from a suitable inert carrier such as pumice, the mixing of a magnesium oxide precusor with the fatty acid feed stock, and continuously contacting the magnesium oxide precursor-fatty acid feed stock mixture with the previously prepared magnesium oxide catalyst bed at decarboxylating temperatures whereby the fatty acid is continuously decarboxylated and whereby the activity of the magnesium oxide catalyst bed is maintained at high levels. The maintenance of the activity of the catalyst may be by the continuous calcination of the magnesium oxide precursor which is admitted to the reaction chamber with the fatty acid feed stock, or may be by continuous deposition of magnesium oxide on the carrier, or it may be due to an unexplained process of preventing the inactivation or removal of the catalyst originally deposited on the inert carrier. Whatever mode or theory may be correct, we have observed and demonstrated the surprising fact that by means of the procedures of this invention the effective life of the catalyst can be extended at high levels over comparatively long periods of time.

The catalyst bed used in this invention may be prepared by conventional means e.g. the procedure set out in Example I below. The use of a catalyst carrier provides a lareg catalyst contact surface, a uniform distribution of the catalyst and prevents caking of the catalyst in the decarboxylation reaction chamber. Suitable carriers may be formed from an inert material that acts as a support for the catalyst. Commonly used inert carriers utilized in this invention include such substances as kieselguhr, porcelain, pumice, silica gel, charcoal, etc. We prefer to use pumice.

In the practice of the invention we prefer to use a magnesium oxide precursor such as magnesium hydroxide, magnesium carbonate, magnesium acetate, or other magnesium salt of a volatile acid. The term "magnesium oxide precursor" is used to mean a substance from which magnesium oxide can be obtained by calcination. Many such substances including magnesium hydroxide, magnesium acetate, magnesium carbonate, magnesium nitrate, etc. are known to the skilled in the art. Magnesium oxide itself may be mixed with a feed stock and used in the process in place of magnesium oxide precursors.

In practicing the method of this invention, a magnesium oxide precursor in the amount of from about 0.5% to 2.0% by weight of the acid is admixed with the fatty acid feed stock. The fatty acid feed stock and magnesium oxide precursor mixture is then brought in to contact with a previously prepared catalyst bed at decarboxylating temperatures.

The preferred temperatures range from about 710° F. to 725° F. The feed rate of the mixture of fatty acid feed stock and magnesium oxide precursor is dependent to some extent upon the temperature employed in the decarboxylation reaction. Where temperatures range from about 710° F. to 725° F. we have found that a feed rate of approximately 5 pounds per hour will give satisfactory results on a catalyst bed size of the dimensions 5 feet 8 inches deep times 3 inches diameter. This amount of catalyst will weigh from 8 pounds to 8.8 pounds if the inert support is pumice (2–4 mesh).

The method of this invention is further illustrated by the following examples:

Example I

The ordinary active life of a magnesium oxide catalyst in fatty acid decarboxylation was demonstrated by the following experiment. A magnesium oxide catalyst bed was prepared according to the following procedure. Five pounds of magnesium acetate dissolved in 5 pounds of water was added to 7.5 pounds of 2-4 mesh pumice and the mixture was allowed to soak overnight. Following the soaking the excess acetate solution was drained off and the pumice was dried in a vacuum oven. After drying the magnesium acetate-impregnated pumice was soaked in 90% formic acid for two days and then placed in the reactor tube. Air was blown through the catalyst for one hour at 700-725° F. At the end of this time the calcination was complete and the catalyst comprising magnesium oxide distributed and impregnated upon pumice was fully formed.

The catalyst bed was tested in a reactor comprising a vertical, electrically heated stainless steel tube (7 feet long with a 3 inch diameter) having a feed preheater and condensor. A small metering pump was used to feed the feed stock mixture to the reactor. During the testing procedure the feed mixture was pumped into the preheater and downward through the catalyst. The ketones formed by the decarboxylation reaction were condensed, collected, washed with water and dried. Samples were taken daily and analyzed for fatty acid and symmetrical ketone. This experiment is summarized in the following data:

Catalyst weight _____ 7.9 lbs.
Catalyst bed size _____ (1)
Feed:
  1 mole capric acid } mixed _____ 295 lbs.
  3 moles acetic acid
Temperature of catalyst bed _____ 710-723° F.
Pressure _____ Atmospheric.
Time _____ 59.5 hours.
Feed rate—Average _____ 5 lbs./hour
Yield—Crude product _____ 131.7 lbs.

[1] 5 ft. 2 in. deep x 3 in. diameter.

| Analysis | Average of Daily Samples, percent | Last Sample at End of Test, percent |
| --- | --- | --- |
| Capric Acid | 13 | 31 |
| Methylnonyl Ketone | 65 | 54 |
| Dinonyl Ketone | 22 | 15 |

It will be seen from the above example that the proportion of methylnonyl ketone produced decreased during the reaction period and that the amount of unreacted fatty acid increased until at the end of 59.5 hours 31% of the fatty acid feed stock was unreacted.

Example II

A magnesium oxide catalyst was prepared by dissolving 5.3 pounds of magnesium acetate in 5.2 pounds of water. 8.3 pounds of 2-4 mesh pumice was added to this solution and allowed to soak overnight. Following the soaking, the excess magnesium acetate solution was drained off and the pumice was dried in a vacuum oven. After drying, the catalyst weighed 9.7 pounds indicating that 1.4 pounds of magnesium acetate had been retained on the pumice surface. This is equivalent to a 5% magnesium oxide content in the bed. This was identical to the catalyst prepared in Example I except that the dried catalyst was not treated with formic acid.

The decarboxylation procedure was identical to that performed in Example I except that 0.5% by weight of magnesium hydroxide was added to the fatty acid feed stock. The following data summarizes the results of this experiment.

Catalyst weight _____ 8.8 lbs.
Catalyst bed size _____ (1)
Feed:
  1 mole capric acid  } mixed _____ 306 lbs.
  3 moles acetic acid
  0.5% Mg(OH)₂
Temperature of catalyst bed _____ 710-725° F.
Pressure _____ Atmospheric.
Time _____ 58 hours.
Feed rate—Average _____ 5.3 lbs./hour.
Yield—Crude product _____ 134.5 lbs.

[1] 5 ft. 8 in. deep x 3 in. diameter.

| Analysis | Average of Daily Samples, percent | Last Sample at End of Test, percent |
| --- | --- | --- |
| Capric Acid | 7 | 6 |
| Methylnonyl Ketone | 73 | 77 |
| Dinonyl Ketone | 20 | 12 |

From this example it can be seen that though the catalysts at the beginning were the same in both Examples I and II, that after 58 hours the activity of the catalyst in the process of Example II had not diminished and that the conversion to methylnonyl ketone had increased and that the proportion of unreacted fatty acids removed from the reactor after 58 hours had also decreased.

Basing our conclusions on ketone experiments using MgO, we find that the rates, temperatures, and MgO derived from any soluble salt as before named will give the same results as shown in Example II. This would include all the unsymmetrical ketones from C-8, C-10, C-12, C-14, C-16 and C-18, when reacted with acetic acids.

While in the foregoing specification this invention has been described in relation to the specific embodiments thereof and many details have been set forth for the purpose of illustration, it will be apparent to those skilled in the art that the invention is susceptible of many other embodiments and that many of the details set forth in this specification can be varied widely without departing from the basic concept of the invention.

We claim:

1. The process of decarboxylating fatty acids to produce ketones comprising mixing from about 0.5% to about 2.0% by weight of a magnesium compound which upon calcination will yield magnesium oxide with a fatty acid having from 8 to 22 carbon atoms, and continuously contacting the resulting mixture of fatty acid and magnesium salt at a decarboxylating temperature with a magnesium oxide catalyst supported upon an inert carrier.

2. The process of decarboxylating fatty acids to produce ketones comprising mixing from about 0.5% to about 2.0% by weight of a magnesium compound which upon calcination will yield magnesium oxide with a major portion of fatty acid having from 8 to 22 carbon atoms and a minor portion of fatty acid having from 1 to 22 carbon atoms, and continuously contacting the resulting mixture of fatty acid and magnesium compound at a decarboxylating temperature with a magnesium oxide catalyst supported upon an inert carrier.

3. The method of decarboxylating fatty acids to produce ketones having from 8 to 22 carbon atoms comprising continuously contacting a mixture of fatty acids and a magnesium compound which upon calcination will yield magnesium oxide at a decarboxylating temperature with a catalyst bed having magnesium oxide supported on a catalyst carrier, said mixture of fatty acids and magnesium oxide precursor having a magnesium oxide precursor content equivalent to about .5% by weight of the fatty acids present in the mixture.

4. The process of decarboxylating fatty acids to produce ketones comprising mixing from about 0.5% to about 2.0% by weight of a magnesium compound selected from the group consisting of magnesium oxide, magnesium hydroxide, magnesium acetate, magnesium carbonate, and magnesium nitrate dispersed in a mixture of acetic acid with a fatty acid having from 8 to 22 carbon atoms, and continuously contacting the resulting mixture of fatty acid and magnesium compound at from about 710° F. to 725° F. with a magnesium oxide catalyst supported upon an inert carrier.

5. The process of producing aliphatic ketones which comprises continuously reacting a mixture of fatty acids having from 8 to 22 carbon atoms, said mixture of fatty acids having admixed therewith from about 0.5% to about 2.0% of a magnesium compound which upon calcination will yield magnesium oxide at a decarboxylating temperature with a magnesium oxide catalyst supported upon an inert carrier.

References Cited in the file of this patent
UNITED STATES PATENTS 2,612,524 Zettlemoyer et al. _____ Sept. 30, 1952

FOREIGN PATENTS 763,512 Great Britain _____ Dec. 12, 1956